United States Patent [19]

Postle

[11] 4,234,677
[45] Nov. 18, 1980

[54] PYRAZOLONE DYESTUFFS AND THEIR USE IN PHOTOGRAPHIC MATERIALS

[75] Inventor: Stephen R. Postle, Brentwood, England

[73] Assignee: Ciba-Geigy AG, Basel, Switzerland

[21] Appl. No.: 5,647

[22] Filed: Jan. 22, 1979

[30] Foreign Application Priority Data

Jan. 26, 1978 [GB] United Kingdom ............... 3110/78
Feb. 16, 1978 [GB] United Kingdom ............... 6089/78

[51] Int. Cl.³ ............... C07D 231/08; C07D 401/06; C07D 403/06
[52] U.S. Cl. ............... 430/518; 430/517; 430/522; 542/442; 542/443; 542/444; 548/364; 548/365
[58] Field of Search ............... 96/84 A, 84 R, 84; 542/442, 443, 444; 548/365, 364; 430/518, 517, 522

[56] References Cited

U.S. PATENT DOCUMENTS

| | | | |
|---|---|---|---|
| 3,615,546 | 10/1971 | Depoorter et al. | 542/442 |
| 3,740,228 | 6/1973 | Ohlschlager et al. | 96/84 A |
| 3,746,539 | 7/1973 | Ohmatsu et al. | 96/84 R |

FOREIGN PATENT DOCUMENTS

| | | | |
|---|---|---|---|
| 1240930 | 8/1960 | France | 542/442 |
| 506094 | 4/1971 | Switzerland | 96/84 A |
| 506385 | 5/1939 | United Kingdom | 542/442 |

OTHER PUBLICATIONS

Vystrčil et al., Chem. Abst. 48 (1954) 165a.
De et al., Chem. Abstracts 31 col. 1403.

*Primary Examiner*—Arthur P. Demers
*Attorney, Agent, or Firm*—Sprung, Felfe, Horn, Lynch & Kramer

[57] ABSTRACT

Dyestuffs of the formula

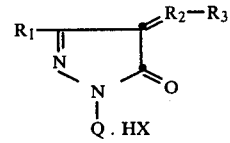

are provided wherein $R_1$ is hydrogen, alkyl, substituted alkyl, aryl, substituted aryl, amino or substituted amino, amido or substituted amido or hydroxyl, alkoxy, thioalkoxy or a carboxyl group or an ester thereof, $R_2$ represents either $-N=$ or a linking group $=CH-(CH=CH)_n$- where n is 0, 1 or 2 and $R_3$ is an optionally substituted heteroaromatic ring which optionally may be benzannelated, an optionally substituted benzene ring, an optionally substituted 5- or 6-membered heterocyclic or carbocyclic ring, which contains at least one hydroxyl group and may optionally be benzannelated, or $R_3$ is a group $-CH(=CH-CH)_n=$ V wherein n is 0, 1 or 2, V is an optionally substituted 5- or 6- membered heterocyclic or carbocyclic ring, and Q is a group of the formula

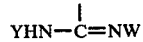

13 Claims, No Drawings

PYRAZOLONE DYESTUFFS AND THEIR USE IN PHOTOGRAPHIC MATERIALS

This invention relates to novel pyrazolone dyestuffs and to their use in photographic materials.

According to the present invention there are provided new dyestuff of the formula

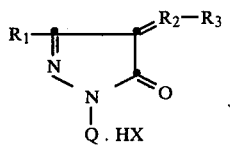
(1)

where $R_1$ is hydrogen, alkyl or substituted alkyl, aryl, substituted aryl, amino or substituted amino, amido or substituted amido, hydroxyl, alkoxy, thioalkoxy, carboxyl or carboxylester, $R_2$ represents either —N= or a linking group =CH—(CH=CH)$_n$— where n is 0, 1 or 2 and $R_3$ is an optionally substituted heteroaromatic ring which optionally may be benzannelated, optionally substituted benzene, an optionally substituted heterocyclic or carbocyclic ring of the formula

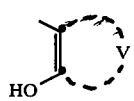
(2)

where V represents the atoms necessary to complete an optionally substituted 5- or 6-membered heterocyclic or carbocyclic ring, which may optionally be benzannelated, or a group

wherein n and V have the indicated meanings (n is preferably 0 or 1), Q is a group of the formula

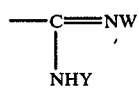
(3)

where each of W and Y are hydrogen, optionally substituted alkyl, optionally substituted cycloalkyl or optionally substituted aryl or together they represent the atoms necessary to complete a 5- or 6-membered ring system, and X is an anion.

Preferred are those dyestuffs of formula (1) wherein $R_1$ is alkyl of 1 to 5 carbon atoms, phenyl or phenyl substituted by halogen, hydroxyl, alkyl or alkoxy of 1 to 5 carbon atoms, $R_2$ is —N= or =CH—(CH=CH)$_n$— where n is 0, 1 or 2 and $R_3$ is an optionally substituted 5- or 6-membered heterocyclic ring which may be optionally benzannelated, phenyl or phenyl substituted by halogen, hydroxy, alkyl of 1 to 5 carbon atoms, carbalkoxyalkoxy with 1 to 5 carbon atoms in each alkoxy moiety or dialkylamino with 1 to 5 carbon atoms in each alkyl radical, $R_3$ is further a heterocyclic ring of the formula

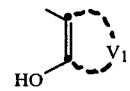

wherein $V_1$ represents the atoms to complete a 5- or 6-membered heterocyclic ring which is optionally substituted by hydroxyl, alkyl of 1 to 5 carbon atoms or cyano, Q is a group of the formula

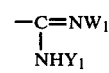

wherein $W_1$ and $Y_1$ are hydrogen or alkyl of 1 to 4 carbon atoms aND X is an anion.

There may be one or more than one substituents attached to the ring system mentioned for $R_3$. Most preferably $W_1$ and $Y_1$ are each hydrogen atoms. X is an anion of an organic or inorganic acid, such as fluoride, chloride, bromide, nitrate, hydrogensulfate, methylsulfate or acetate. The halides and nitrate are preferred.

The dyestuffs of formula (1) where $R_2$ is —N= are prepared by reacting a solution of a pyrazolone of formula

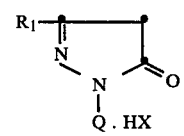
(4)

where $R_1$, Q and X have the indicated meanings with a nitroso compound of the formula $R_3NO$ where $R_3$ has the indicated meaning.

Similarly dyestuffs of formula (1) where $R_2$ is =CH(CH=CH)$_n$— are prepared by reacting a solution of pyrazolone of formula (4) with an aldehyde of the formula $R_3$—(CH=CH)$_n$—CHO where $R_3$ has the indicated meaning, or with an aldehyde derivative such as an acetal or anilino compound.

Preferably in the two processes the solvent for the pyrazolone is acetic acid.

The process may be carried out either at ambient or reflux temperatures.

The pyrazolones employed in this invention may be prepared by the methods of A. Vystrcil and R. Prokes, Chem. Listy, 1952, 46, 670 and of S. C. De and P. C. J. Rakshit, J. Indian Chem. Soc., 1936, 13, 509. In certain cases, for example where $R_1$ is phenyl, 4-nitrophenyl, or amino, the intermediate hydrazone, rather than pyrazolone, is isolated from the reaction and is employed for dye synthesis, ring closure occuring in situ.

The preferred dyes of formula (1) are those of formula (5), (6), (7), (10), (12) and (13).

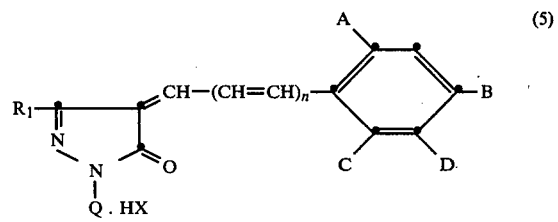
(5)

where $R_1$, Q, X and n have the indicated meanings and A, B and C are each hydrogen, halogen, hydroxy, alkoxy, thioalkoxy, optionally substituted alkyl, optionally substituted aryl, optionally substituted amino, optionally substituted amido or nitro, and D is hydrogen, or C and D together complete an optionally substituted aromatic or heterocyclic ring.

The especially preferred dyes of formula (5) are those wherein $R_1$ is alkyl of 1 to 5 carbon atoms, phenyl or phenyl substituted by halogen, hydroxyl, alkyl or alkoxy of 1 to 5 carbon atoms. A, C, D are each hydrogen, halogen, hydroxy, alkyl of 1 to 5 carbon atoms or carbalkoxyalkoxy of 1 to 5 carbon atoms in each alkoxy moiety B is dialkylamino of 1 to 5 carbon atoms in each alkyl radical, Q is a group of the formula

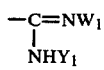

wherein $W_1$ and $Y_1$ are hydrogen or alkyl of 1 to 4 carbon atoms, X is an anion and n is 0 or 1.

Dyestuffs of formula

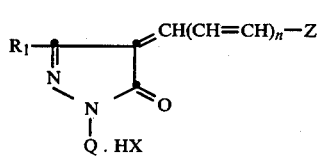 (6)

where Z is a heteroaromatic ring which is optionally substituted and $R_1$, Q, X and n have the indicated meanings.

Examples of preferred dyes of formula (6) are those wherein $R_1$ is alkyl of 1 to 5 carbon atoms, phenyl or phenyl substituted by halogen, hydroxyl, alkyl or alkoxy of 1 to 5 carbon atoms, Q is a group of the formula

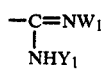

wherein $W_1$ and $Y_1$ are hydrogen or alkyl of 1 to 4 carbon atoms, X is an anion, n is zero or 1 and Z is a group of the formula,

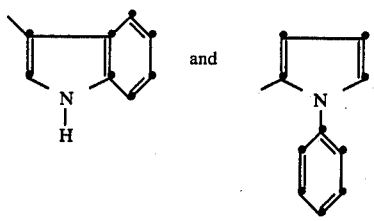

Dyestuffs of formula

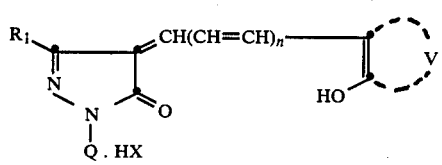 (7)

where $R_1$, Q, X, V and n have the indicated meanings.

Preferred dyestuffs of formula (7) are those wherein $R_1$ is alkyl of 1 to 5 carbon atoms and the group Q is a group of the formula

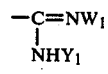

wherein $W_1$ and $Y_1$ are hydrogen or alkyl of 1 to 4 carbon atoms, X is an anion, n is 0, 1 or 2 and the groups

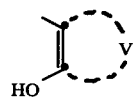

are pyridones of the general formula

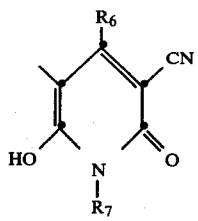 (8)

where $R_6$ and $R_7$ are each alkyl, preferably of 1 to 5 carbon atoms or pyrazolones of the general formula

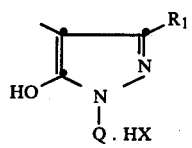 (9)

where $R_1$, Q and X have the indicated meanings. The dyes of formula (9) are bispyrazolone oxonols.

Dyestuffs of formula

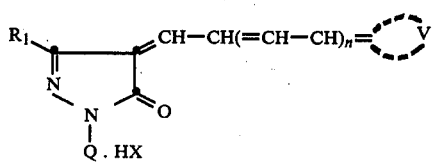 (10)

where $R_1$ Q, X, n and V have the indicated meanings. Particularly preferred groups

are pyrrolines of general formula

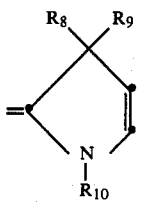 (11)

where $R_8$, $R_9$ and $R_{10}$ are each alkyl or aryl, preferably alkyl of 1 to 5 carbon atoms or phenyl. Dyestuffs of formula

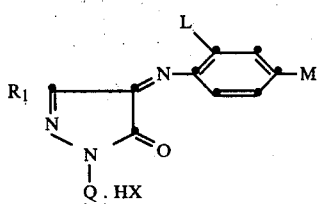
(12)

where $R_1$, Q and X have the indicated meanings and L is hydrogen, alkyl, alkoxy or optionally substituted amino and M is hydroxy, alkoxy or optionally substituted amino.

The especially preferred dyes of this class are those where M is dialkylamino of 1 to 5 carbon atoms in each alkyl radical, preferably methyl and L is hydrogen.

Dyestuffs of formula

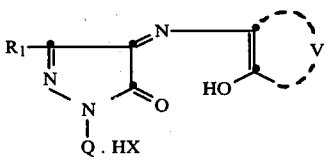
(13)

where $R_1$, Q, X and V have the indicated meanings. Preferred dyestuffs of formula (13) are those wherein $R_1$ is alkyl of 1 to 5 carbon atoms, preferably methyl, Q is a group of the formula

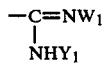

wherein $W_1$ and $Y_1$ are hydrogen or alkyl of 1 to 4 carbon atoms, X is an anion and the group

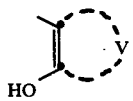

is the pyridone group of formula (8).

The dyestuffs of the present invention are of use as dyes in photosensitive material which are not required to be present in the exposed and processed material. The dyestuffs of the present invention thus are useful as antihalation dyes, filter dyes and as acutance dyes.

The dyestuffs of the present invention are useful in such functions because:

They are fully bleached by the processing procedure, especially by the sulphite in developer solutions, without subsequent regeneration of the dye in the photographic assembly.

They are easily formulated, in general being water-soluble. The majority of them displays controllable and beneficial aggregation in gelatin layers. This has the effects of (a) increasing the visible spectral coverage of the dyes, owing to the emergence of absorption peaks ascribable to the aggregated species, and (b) rendering the dyes excellently substantive in gelatin layers, without adversely affecting their bleachability.

In instances where aggregation (as adjudged by spectral coverages) does not occur (e.g. examples (115) and (118) below) substantivity is greatly reduced.

They possess the ability to mordant other anionic dyes, which are not of themselves very substantive in gelatin. An underlayer assembly containing one of the dyes of this invention and another anionic dye often displays absorption maxima which are not due to the presence of either dye singly in the layer, and may be between, or outside of, the absorption maxima normally displayed by the dyes in gelatin. The dyestuffs of the present invention show improved properties over those of e.g. British Patent Specification No. 506 385.

According to another aspect there is provided light-sensitive photographic material which comprises in at least one layer thereof a dyestuff of general formula (1).

The dyestuff of formula (1) may be present in a resin binder as an anti-halation backing layer on the reverse side of the film base to the photosensitive layer.

However, the dyestuff of formula (1) may be present in an anti-halation underlayer of the photographic material, that is to say between the film base and the lowest light-sensitive layer. The dyestuffs of formula (1) are of particular use in anti-halation underlayers because they are substantive to a coated gelatin layer which is the usual binder used in anti-halation underlayers and they are readily bleached by sulphite.

The dyestuffs of formula (1) are also of use as filter layers in colloid (usually gelatin) inter-layers between light sensitive layers.

Certain of the dyestuffs of formula (1) are also of use in blue-light filter layers placed above the topmost light sensitive layer in a photographic material.

The following Examples will serve to illustrate the invention.

EXAMPLE 1

Dye syntheses

In these syntheses the following preformed pyrazolones of formula (4) are used:

|  | $R_1$ | Q | X |
|---|---|---|---|
| Pyrazolone (101) | $CH_3$ | $CN_2H_3$ | $NO_3$ |
| Pyrazolone (102) | N-propyl | $CN_2H_3$ | $NO_3$ |
| Pyrazolone (103) | p-$CH_3OC_6H_4$ | $CN_2H_3$ | $NO_3$ |

Further the hydrazones of the formula

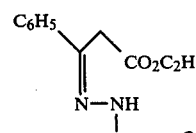
(104)

and

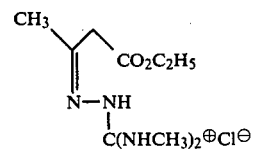
(105)

are used. The latter one for the preparation of dye (119).

Dye (106): Pyrazolone (101) (0.51 g) and indole-3-carboxaldehyde (0.36 g) were heated under reflux in acetic acid (2.5 ml) for ten minutes. The mixture was cooled, drowned in ether and the precipitate washed and dried. Yield=0.82 g, m.p. 226°-8° C.

Dye (107): Essentially as for dye (106) employing instead pyrazolone (102) (0.58 g) and 4-dimethylaminobenzaldehyde (0.37 g). Yield=0.90 g, m.p. 203°-5° C.

Dye (108): Essentially as for dye (107), employing instead hydrazone (104) (0.78 g). Yield=0.88 g, m.p. 172°-5° C.

Dye (109): Essentially as for dye (108), employing instead 2-chloro 4-dimethylaminobenzaldehyde (0.51 g). Yield=1.04 g, m.p. 192°-3° C.

Dye (110): Essentially as for dye (106), employing instead 4-diethylamino-2-ethoxycarbonylmethoxy benzaldehyde (0.70 g). Yield=0.95 g. Decomposes at 100° C.

Dye (111): Essentially as for dye (106), employing instead pyrazolone (103) (0.74 g) and 1-phenylpyrrole-2-carbox-aldehyde (0.43 g). Yield=0.80 g, m.p. 166°-8° C.

Dye (112): Essentially as for dye (108), employing instead 4-dimethylamino cinnamaldehyde (0.44 g). Yield=0.79 g, m.p. 125°-8° C.

Dye (113): Pyrazolone (101) (0.51 g) and 3-cyano-5(5'-2"4"-dinitroanilinopenta-1,3-dienylino)-1-ethyl-6-hydroxy-4-methylpyrid-2-one (1.06 g) were stirred in acetic acid (10 ml) at ambient temperature for thirty minutes. The mixture was drowned in ether and the precipitate washed and dried. Yield=1.36 g, m.p. 202°-3° C.

Dye (114): Essentially as for dye (108), employing instead 4-dimethylamino nitrosobenzene (0.42 g). Yield=1.02 g, decomposes at 120° C.

Dye (115): Essentially as for dye (106), employing instead 3-cyano-1-ethyl-6-hydroxy-4-methyl-5-nitrosopyrid-2-one (0.52 g). Yield=0.85 g, decomposes at 250° C.

Dye (116): Pyrazolone (101) (1.03 g) and 1,1,3,3-tetramethoxypropane (0.49 g) were heated under reflux in acetic acid (5 ml) for ten minutes. The mixture was cooled and drowned in ether, and the precipitate washed and dried. Yield=0.80 g, m.p. 219°-21° C.

(117): Pyrazolone (101) (1.03 g) and glutaconic aldehyde mono-2',4'-dinitro anil (0.66 g) were stirred at ambient temperature in acetic acid (10 ml) for twenty minutes. The mixture was drowned in ether and the precipitate washed and dried. Yield=1.15 g, m.p. 218°-20° C.

Dye (118): Pyrazolone (101) (1.03 g) and 2-(2"-acetanilidovinyl) 1-ethyl-3,3-dimethylpyrrolinium iodide (2.06 g) were heated under reflux in acetic acid (2.5 ml) for twenty minutes. The mixture was cooled and drowned in ether and the precipitated oil washed and reprecipitated from acetone into ether, to yield a red solid (1.11 g), m.p. 96°-97° C.

Dye (119): Hydrazone (105) (0.44 g) and 1,1,3,3-tetramethoxypropane (0.15 g) were heated at reflux in acetic acid (2 ml) for 10 minutes. The cooled mixture was precipitated into ether, and reprecipitated twice from methanol into ether to give a gum (0.34 g).

The following table show the specific examples of dyes of formula (1) the manufacture of which is previously described.

| Dye No. | $R_1$ | $R_3$ | $R_2$ | Q | X |
|---|---|---|---|---|---|
| (106) | $CH_3$ | indol-3-yl (N-H) | =CH— | —C(=NH)—NH$_2$ | $NO_3^\ominus$ |
| (107) | n-$C_3H_7$ | 4-(N(CH$_3$)$_2$)phenyl | =CH— | —C(=NH)—NH$_2$ | $NO_3^\ominus$ |
| (108) | $C_6H_5$ | 4-(N(CH$_3$)$_2$)phenyl | =CH— | —C(=NH)—NH$_2$ | $NO_3^\ominus$ |
| (109) | $C_6H_5$ | 3-chloro-4-(N(CH$_3$)$_2$)phenyl | =CH— | —C(=NH)—NH$_2$ | $NO_3^\ominus$ |
| (110) | $CH_3$ | 4-(N($C_2H_5$)$_2$)-2-(OCH$_2$CO$_2$C$_2$H$_5$)phenyl | =CH— | —C(=NH)—NH$_2$ | $NO_3^\ominus$ |
| (111) | 4-$CH_3O$-phenyl | 1-phenylpyrrol-2-yl | =CH— | —C(=NH)—NH$_2$ | $NO_3^\ominus$ |

-continued

| Dye No. | $R_1$ | $R_3$ | $R_2$ | Q | X |
|---|---|---|---|---|---|
| (112) | $C_6H_5$ | 4-(dimethylamino)phenyl with $CH_3$ substituent | =CH—(CH=CH)— | —C(=NH)NH$_2$ | $NO_3^\ominus$ |
| (113) | $CH_3$ | 1-ethyl-4-hydroxy-6-methyl-3-cyano-2-oxo-1,2-dihydropyridin-5-yl with $CH_3$ | =CH—(CH=CH)$_2$— | —C(=NH)NH$_2$ | $NO_3^-$ |
| (114) | $C_6H_5$ | 4-(dimethylamino)phenyl with $CH_3$ | =N— | —C(=NH)NH$_2$ | $NO_3^\ominus$ |
| (115) | $CH_3$ | 1-ethyl-4-hydroxy-6-methyl-3-cyano-2-oxo-1,2-dihydropyridin-5-yl with $CH_3$ | =N— | —C(=NH)NH$_2$ | $NO_3^\ominus$ |
| (116) | $CH_3$ | 5-hydroxy-4-methyl-1-Q·HX-pyrrol-2-yl with $CH_3$ | =CH—(CH=CH)— | —C(=NH)NH$_2$ | $NO_3^\ominus$ |
| (117) | $CH_3$ | 5-hydroxy-4-methyl-1-Q·HX-pyrrol-2-yl with $CH_3$ | =CH—(CH=CH)$_2$— | —C(=NH)NH$_2$ | $NO_3^\ominus$ |
| (118) | $CH_3$ | 1-ethyl-gem-dimethyl dihydropyridine derivative | =CH— | —C(=NH)NH$_2$ | $NO_3^\ominus$ |
| (119) | $CH_3$ | 5-hydroxy-4-methyl-1-Q·HX-pyrrol-2-yl with $CH_3$ | =CH—(CH=CH)— | —C(=NCH$_3$)NCH$_3$ | $Cl^\ominus$ |

EXAMPLE 2 Use Example

Dyed coated gelatin layers were prepared as follows:

Stock Solutions
6% Gelatin Gelatin 6 g
    Distilled water
Swell at room temperature for 30 minutes and then dissolve at 60° C. Adjust to 40° C.
Dyestuff 2.5 × 10$^{-3}$ molar
Dissolve 0.25 mMol of the dyestuff in 10 ml water or 2-ethoxy ethanol. Adjust solution to 40° C.
Hardener 1%
Dissolve 100 mg of 1,3-dichlortriazine-5-aminobenzene-4-sulfonic acid in 10 ml water. Adjust solution to 40° C.
Wetting agent 5% neutral or anionic wetting agent
Coating solution Gelatin stock solution 3.5 ml
    Distilled water 5.0 ml
    Wetting agent[1] 0.25 ml -continued Dyestuff 0.232 ml
    Hardener 1.0 ml

[1]Diisobutylnaphthalenesulfonic-acid-sodium, 8% solution in water-ethanol 95:5.

Coat at 40° C. on plates affixed with triacetate base and allow to set for 5 minutes on a cold plate ($\approx 10°$ C.). Dry at room temperature.

| Gel coating weight | 91.3 mg/dm$^2$ |
|---|---|
| mMol Dye/100 g gel | 2.76 |
| Dye coating weight | 0.0025 mMol/dm$^2$ |

Fourteen samples were prepared from dyes (106) to (119).

Substantivity Measurement

A 5 cm² disc was cut and the visible spectrum measured. The disc was soaked in water (7.5 ml) for 30 minutes. The disc was allowed to dry and the spectrum measured again.

$$\text{Substantivity} = \frac{\text{D max of soaked disc}}{\text{D max of unsoaked disc}} \times 100$$

Bleachability Measurement

A strip 2.5×7.5 cm was immersed 2.5 minutes in developer, 2 minutes in a fixing bath and washed 10 minutes in water before drying.

$$\text{Bleachability} = 100\left(1 - \frac{\text{D max of bleached strip}}{\text{D max of unbleached strip}}\right)$$

The developer used comprised per 1000 ml, N-methylamino-p-phenolsulfate, sodium sulphite (anhydrous) 75 g, hydroquinone 8 g, sodium carbonate (anhydrous) 37.5 g and potassium bromide 2 g.

The fixer used comprised 82 g of ammonium thiosulphate per 1000 ml 2 g of.

The following results were obtained:

| Dye | Light absorption maximum in methanol (nm) | Light absorption maximum in gelatin (nm) | Substantivity | Bleachability |
|---|---|---|---|---|
| (106) | 448 | 460, 435 | 100 | 95 |
| (107) | 504 | 518, 436 | 100 | 100 |
| (108) | 501 | 520, 456 | 99 | 95 |
| (109) | 500 | 563, 510, 465 | 100 | 96 |
| (110) | 497, 432 | 505, 484, 434 | 99 | 98 |
| (111) | 430 | 430 | 100 | 94 |
| (112) | 588 | 610, 486 | 100 | 96 |
| (113) | 648, 620, (sh) | 625, 473 | 96 | 100 |
| (114) | 565 | 580(sh), 535, 490(sh) 446(sh) | 86 | 100 |
| (115) | 560 | 568 | 7 | 100 |
| (116) | 517, 485(sh) | 559, 522, 481, 432 | 91 | 98 |
| (117) | 613, 568(sh) | 640, 474 | 93 | 100 |
| (118) | 416 | 418 | 11 | 98 |
| (119) | 519 | 506 | 12 | 100 |

(sh) = shoulder

EXAMPLE 3 Use Example as a mordant (a) Stock solutions were made as follows:
Dye (107) 0.25 mMols in 10 ml H₂O
Dye (120) 0.25 mMols in 10 ml H₂O
(dye (120) is bis-(1-butyl-3-cyano-6-hydroxy-4-methylpyrid-2-one) trimethine oxonol triethylamine salt—Britisch Patent Specification No. 1,278,621).

The two stock solutions were used as follows to make a coating solution (other components were prepared as in Example 2):

| Gelatin stock solution | | 3.5 | ml |
|---|---|---|---|
| Wetting agent | | 0.25 | ml |
| Hardener | | 1.0 | ml |
| Dye (107) solution | | 0.696 | ml |
| Dye (120) solution | | 0.232 | ml |
| Distilled water | to | 10 | ml. |

The solution was coated and processed as in Example 2.

(b) as for (a), save that a solution of dye (108) (0.25 mMols in 10 ml water—0.232 ml) was used instead of the solution of dye (107).

(c) as for (a), save that dye (120) was coated alone (0.232 ml).

| Coating | Light absorption maxima in gelatin (nm) | Overall substantivity (%) | Overall bleachability (%) |
|---|---|---|---|
| (a) | 440, 505, 552, 610 | 100 | 100 |
| (b) | 437, 505, 610, 640 | 96 | 97 |
| (c) | 608 | 44 | 99 |

This shows that the presence of either dye (107) or dye (108) increases the substantivity of dye (120), and that an absorption maximum not ascribable to the presence of either dye alone is generated.

I claim:

1. A dyestuff of the formula

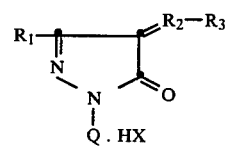

wherein, $R_1$ is alkyl of 1 to 5 carbon atoms, amino, amido, hydroxyl or carboxyl, phenyl substituted by halogen, hydroxyl, alkyl or alkoxyl of 1 to 5 carbon atoms, $R_2$ is $-N=$ or $=CH-(CH=CH)_n-$ where n is 0, 1 or 2 and $R_3$ is 5-membered nitrogen-containing heterocyclic ring with 1 or 2 nitrogen atoms, a 6-membered nitrogen-containing heterocyclic ring with 1 nitrogen atom or these rings fused with a benzene ring, phenyl or phenyl substituted by halogen, hydroxyl, alkyl of 1 to 5 carbon atoms, carbalkoxyalkoxy with 1 to 5 carbon atoms in each alkoxy moiety or dialkylamino with 1 to 5 carbon atoms in each alkyl radical, $R_3$ is further a heterocyclic ring of the formula

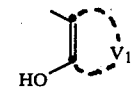

wherein, $V_1$ represents the atoms to complete a 5- or 6-membered nitrogen-containing heterocyclic ring with 1 or 2 nitrogen atoms or this ring substituted by hydroxyl, alkyl of 1 to 5 carbon atoms or cyano, and Q is a group of the formula

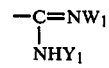

wherein $W_1$ and $Y_1$ are hydrogen or alkyl of 1 to 5 carbon atoms and

X is an anion.

2. A dyestuff according to claim 1 of the formula

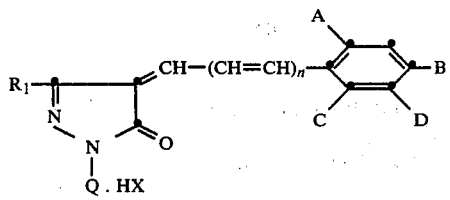

wherein
R$_1$ is alkyl of 1 to 5 carbon atoms, phenyl or phenyl substituted by halogen, hydroxyl, alkyl or alkoxy of 1 to 5 carbon atoms, A, C, D are each hydrogen, halogen, hydroxyl, alkyl of 1 to 5 carbon atoms or carbalkoxyalkoxy of 1 to 5 carbon atoms in each alkoxy moiety,
B is dialkylamino of 1 to 5 carbon atoms in each alkyl radical,
Q is a group of the formula

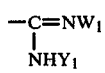

wherein,
W$_1$ and Y$_1$ are hydrogen or alkyl of 1 to 4 carbon atoms and
X is an anion and n is 0 or 1.

3. A dyestuff according to claim 1 of the formula

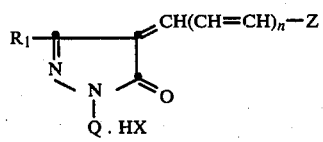

wherein,
R$_1$ is alkyl of 1 to 5 carbon atoms, phenyl or phenyl substituted by halogen, hydroxyl, alkyl or alkoxy of 1 to 5 carbon atoms, Z is of the formula

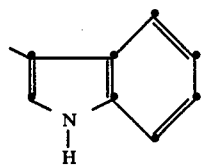

or of the formula

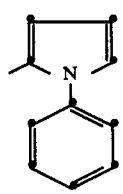

Q is a group of the formula

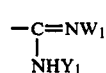

wherein

W$_1$ and Y$_1$ are hydrogen or alkyl of 1 to 4 carbon atoms, X is an anion and n is zero or 1.

4. A dyestuff according to claim 1 of the formula

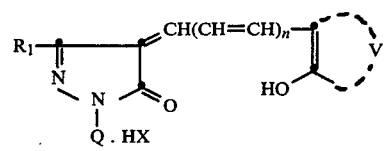

wherein,
R$_1$ is alkyl of 1 to 5 carbon atoms and the group Q is a group of the formula

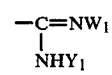

wherein,
W$_1$ and Y$_1$ are hydrogen or alkyl of 1 to 4 carbon atoms,
X is an anion, n is 0, 1 or 2 and the group

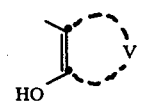

is either a pyridone of the formula

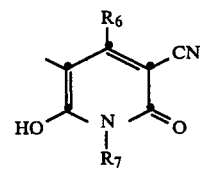

wherein,
R$_6$ and R$_7$ are each alkyl groups of 1 to 5 carbon atoms or is a pyrazolone of the general formula

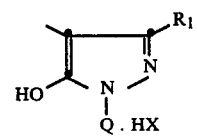

where R$_1$, Q and X have the indicated meanings.

5. A dyestuff according to claim 1 of the formula

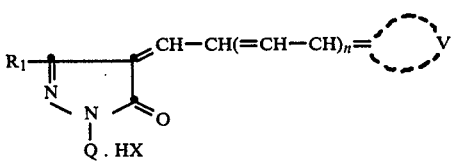

wherein, the group

is a pyrroline of the formula

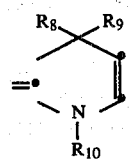

wherein,
R₈, R₉ and R₁₀ are each alkyl of 1 to 5 carbon atoms or phenyl.

6. A dyestuff according to claim 1 of the general formula

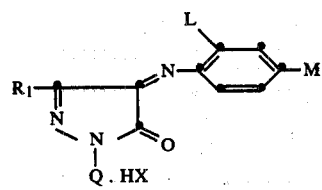

wherein,
R₁, Q and X have the meanings assigned to them in claim 1, L is hydrogen and
M is dialkyl amino with 1 to 5 carbon atoms in each alkyl moiety.

7. A dyestuff according to claim 1 of the formula

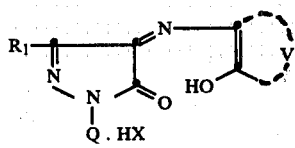

wherein,
R₁ is alkyl of 1 to 5 carbon atoms,
Q is a group of the formula

wherein,
W₁ and Y₁ are hydrogen or alkyl of 1 to 4 carbon atoms,
X is an anion and the group ![pyridone ring structure]

is a pyridone group of the formula

![pyridone formula with R6, CN, HO, N-R7, O]

wherein,
R₆ and R₇ are each alkyl groups of 1 to 5 carbon atoms.

8. Photographic material which comprises in at least one layer thereof a dyestuff according to claim 1.

9. Photographic material according to claim 8, wherein the layer which contains the dyestuff is an antihalation underlayer.

10. Photographic material according to claim 8 which also comprises an anionic dye mordanted to the dyestuff.

11. Photographic material according to claim 9 which also comprises an anionic dye mordanted to the dyestuff.

12. Photographic material according to claim 8 wherein the layer which contains the dyestuff is a filter layer.

13. Photographic material according to claim 12 wherein the layer which contains the dyestuff is a blue-light filter layer.

* * * * *